(12) United States Patent
Li et al.

(10) Patent No.: US 7,942,305 B1
(45) Date of Patent: May 17, 2011

(54) SOLDERING APPARATUS

(75) Inventors: Shen-Chun Li, Taipei Hsien (TW);
Shou-Kuo Hsu, Taipei Hsien (TW);
Yung-Chieh Chen, Taipei Hsien (TW);
Hsien-Chuan Liang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/822,309

(22) Filed: Jun. 24, 2010

(30) Foreign Application Priority Data

Mar. 17, 2010 (TW) .................................. 099107733

(51) Int. Cl.
*B23K 37/00* (2006.01)
*B23K 37/04* (2006.01)
*B23K 3/02* (2006.01)
(52) U.S. Cl. .......... 228/6.2; 228/44.7; 228/49.5; 228/54
(58) Field of Classification Search ........................ None
See application file for complete search history.

(56) References Cited

U.S. PATENT DOCUMENTS

| 4,795,076 A * | 1/1989 | Gottschild ...................... 228/54 |
| 6,972,396 B2 * | 12/2005 | Miyazaki ...................... 219/229 |
| 2004/0206740 A1 * | 10/2004 | Miyazaki ...................... 219/229 |
| 2006/0226198 A1 * | 10/2006 | Carlomagno ...................... 228/51 |
| 2010/0243712 A1 * | 9/2010 | Wootton et al. .................. 228/51 |

FOREIGN PATENT DOCUMENTS

JP  62-093067 A  *  4/1987
JP  63-043763 A  *  2/1988

* cited by examiner

*Primary Examiner* — Kiley Stoner
(74) *Attorney, Agent, or Firm* — Clifford O. Chi

(57) ABSTRACT

A soldering apparatus includes a base body, an actuator connected to the base body, and a pair of soldering arms connected to the actuator, each of the pair of soldering arms including a heating member and a soldering tip thermally coupled to the heating member. The pair of soldering arms is moveable and the actuator is controllable to move one soldering arm relative to the other soldering arm.

11 Claims, 3 Drawing Sheets

SOLDERING APPARATUS

BACKGROUND

1. Technical Field

The present disclosure generally relates to soldering, and particularly, to a soldering apparatus having at least two soldering arms.

2. Description of Related Art

An electronic device often houses a printed circuit board therein with a plurality of electronic components fixed thereon by soldering. If the joints formed by soldering are unstable or the electronic components are misaligned, a soldering apparatus is required to be used to perform the resoldering process. The typical soldering apparatus commonly includes a soldering tip to melt the solder tin for connecting a plurality of pins of the electronic components to the printed circuit board, and a heating member to heat the soldering tip. However, the soldering tip is usually in the form of a substantially cylindrical shape with a relatively large standard diameter, and thus cannot accommodate various electronic components of small size. In addition, the soldering apparatus is provided typically with only one soldering tip and is also manually operated, such that if there is a need to redo multiple joints, the soldering efficiency is thereby reduced.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
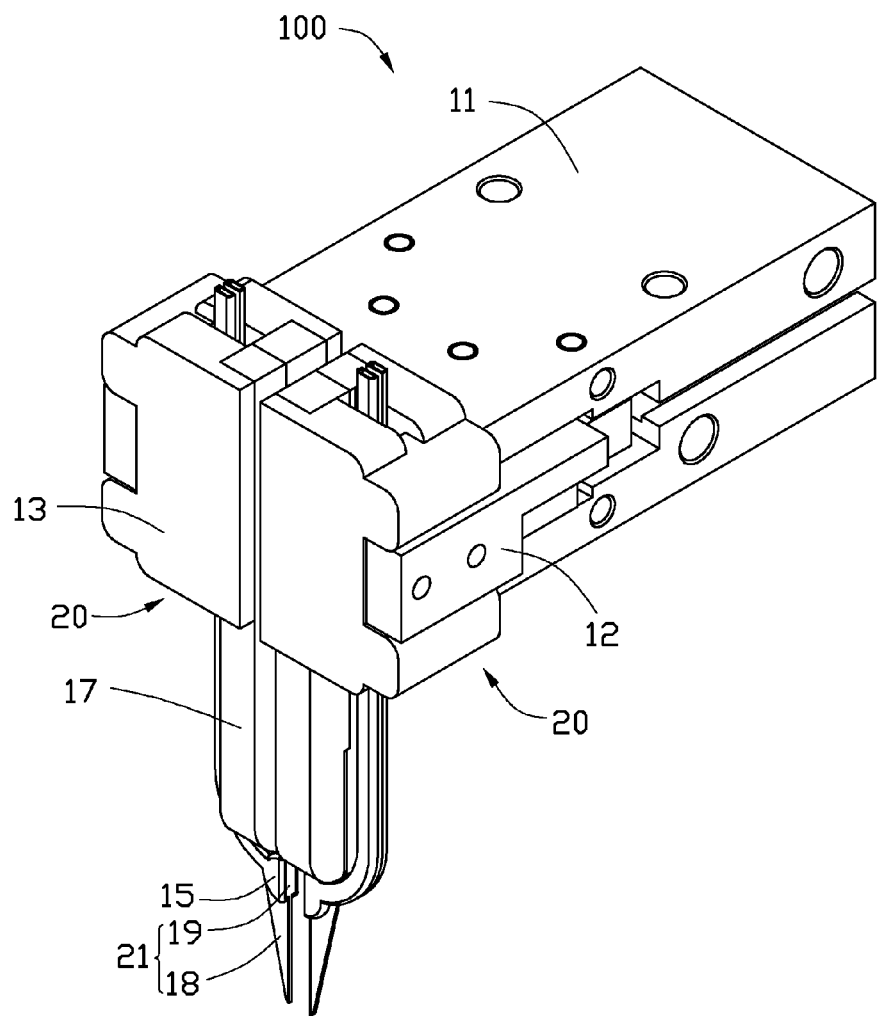
FIG. 1 is an isometric view of one embodiment of a soldering apparatus including a pair of clamping arms, each of which bears a soldering tip.

Referring to FIG. 1, one embodiment of a soldering apparatus 100 includes a base body 11, a pair of soldering arms 20 movable relative to each other, and an actuator 12 mounted to the base body 11 to move the soldering arms 20. The soldering apparatus 100 can be used to heat the solder for attaching a plurality of pins of electronic components to a printed circuit board. Because the soldering arms 20 are movable relative to each other, the distance between the pair of the soldering arms 20 is adjustable via the actuator 12, thus the soldering apparatus 100 can accommodate electronic components of varying sizes, and solder two joints simultaneously.

Figure 2:
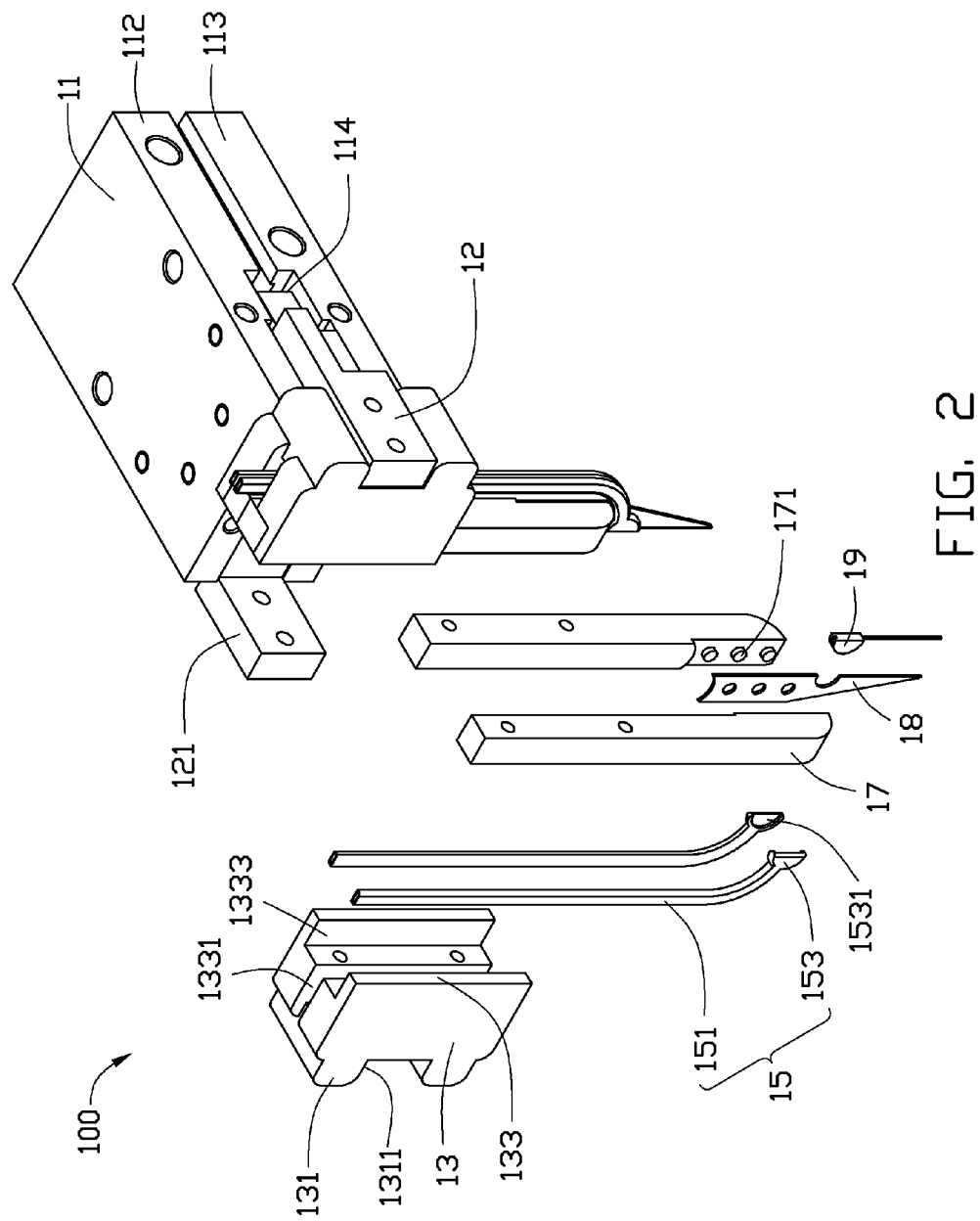
FIG. 2 is an exploded, isometric view of the soldering apparatus of FIG. 1.

Referring to FIGS. 1 and 2, in this embodiment, each soldering arm 20 includes a fixing body 13, a pair of heating members 15 extending through the fixing body 13, a pair of clamping members 17 mounted to the fixing body 13, and a soldering head 21, including a positioning member 18 and a soldering tip 19 coupled to the positioning member 18.

The base body 11 can be connected to a manipulator (not shown), thus the soldering apparatus 100 can be operated by the manipulator. The base body 11 includes an upper plate 112 and a lower plate 113. The upper plate 112 and the lower plate 113 cooperatively define a groove 114 therebetween.

The actuator 12 includes a power source (not shown) and two connection portions 121 coupled to the power source. The power source can be a pneumatic component, an electric actuator, or the like, to move the two connection portions 121 to a plurality of predetermined positions.

The fixing body 13 is provided with a first side surface 131 defining a connection groove 1311 and a second side surface 133, opposite to the first side surface 131, defining a first receiving groove 1331 and a second receiving groove 1333 communicated with the first receiving groove 1331. The connection portion 121 of the actuator 12 is received in the connection groove 1311 for connecting the soldering arm 20 to the actuator 12. In the illustrated embodiment, the connection groove 1311 extends substantially perpendicular to the first and second receiving grooves 1331, 1333."

Each heating member 15 is substantially "L" shaped, and includes a connection portion 151 coupled to a heat source and a heating portion 153 integrally formed on an end of the connection portion 151. The heating portion 153 is substantially semi-cylindrical defining a latching groove 1531 therein. The pair of heating members 15 is arranged with the two latching grooves 1531 in a face-to-face configuration.

The clamping member 17 is substantially an elongated block. One clamping member 17 defines a plurality of positioning portions 171, and the other clamping member 17 forms a plurality of corresponding grooves (not shown) thereon. In the illustrated embodiment, three positioning portions 171 are deployed, where each is substantially a post. The clamping members 17 are arranged in parallel.

Figure 3:
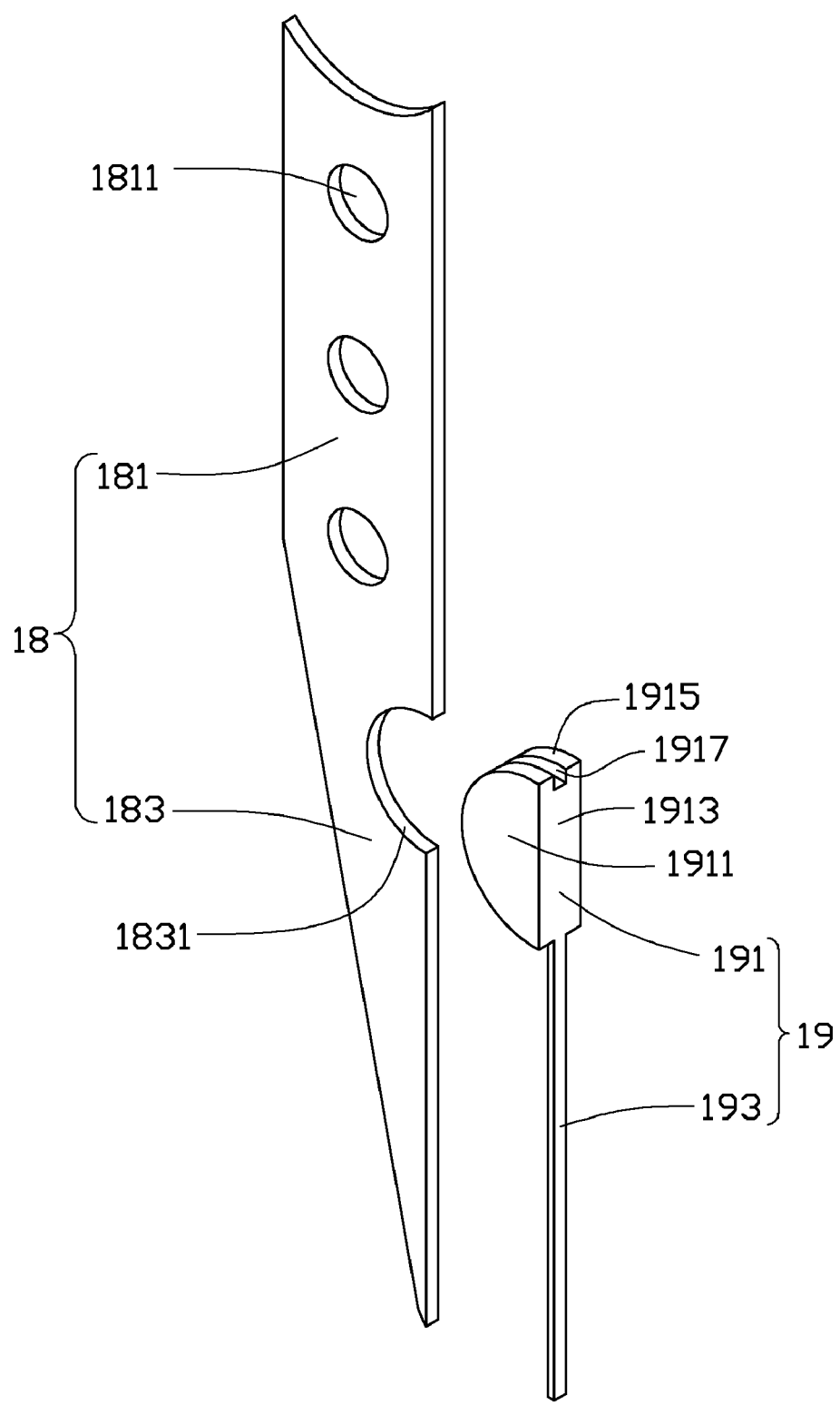
FIG. 3 is an isometric view of the soldering tip of the soldering apparatus of FIG. 1.

Referring to FIGS. 2 and 3, the positioning member 18 includes a connection portion 181 and a latching portion 183 extending from an end of the connection portion 181 in a coplanar manner. In the illustrated embodiment, the connection portion 181 is substantially rectangular, and the latching portion 183 is substantially triangular and defines a substantially semi-cylindrical cutout 1831. The positioning member 18 is made of heat-resistant materials, such as, for example, copper. The positioning member 18 defines a plurality of connection holes 1811, which are corresponding to the positioning portions 171 on the clamping member 17.

The soldering tip 19 includes a connection portion 191 and a contact head 193 extending from the bottom thereof. The connection portion 191 is substantially of a semi-cylindrical shape, and which has two opposite side surfaces 1911, a front surface 1913, and an outer circumferential surface 1915 adjoining the side surfaces 1911 and the front surface 1913. The outer circumferential surface 1915 defines a circumferentially extending latching groove 1917 thereon corresponding to the cutout 1831 of the positioning member 18. The contact head 193 is substantially needle-shaped having a small diameter, thus the contact head 193 can accommodate electronic components of smaller sizes. The soldering tip 19 is highly conductive and rigid, made of, for example, ceramic or tungsten steel.

The connection portion 191 of the soldering tip 19 is received in the cutout 1831, with the latching portion 183 latching into the latching groove 1917 and the surface of the contact head 193 contacting the latching portion 183. The two heating portions 153 of the pair of heating members 15 contact the two side surfaces 1911 of the soldering tip 19, respectively, and the connection portions 151 extend through the first receiving groove 1331 to couple to a heat source. The clamping members 17 clamp the position member 18 therebetween with the positioning portions 171 received in the corresponding connection holes 1811. The clamping members 17 are received in the second receiving groove 1333, and are fixed to the fixing body 13. The fixing body 13 is connected to the actuator 12 with the connection portion 121 received in the connection groove 1311.

Here, heating the solder for attaching various pins of electronic components to a printed circuit board is used as an example to illustrate the operation of the soldering apparatus 100. The soldering apparatus 100 is connected to a manipulator, and is moved and positioned automatically thereby. The heating member 15 transmits heat to the soldering tip 19. Because the clamping arms 20 are movable relative to each other via the actuator 12, the distance between the contact points of the two contact heads 193 is adjustable, thus accommodating electronic components of varying size. It should be understood that a vision detection system (not shown) can be mounted on the manipulator to detect the position of the electronic components, thus facilitating the automatic soldering.

It should be understood that, in other embodiments, the soldering apparatus 100 can be provided with more movable clamping arms 20, and the clamping arms 20 can be arranged in a nonparallel configuration.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A soldering apparatus comprising:
   a base body;
   an actuator connected to the base body; and
   at least two soldering arms connected to the actuator, each of the at least two soldering arms comprising a heating member and a soldering tip thermally coupled to the heating member;
   a pair of clamping members connected to the base body and clamping the soldering tip therebetween; and
   a positioning member positioned between the pair of clamping members and coupled to the soldering tip;
   wherein the soldering tip comprises a connection portion and a contact head integrally formed with the connection portion, the connection portion defines a latching groove, the positioning member comprises a latching portion engaging the latching groove, at least one of the soldering arms is moveable, and the actuator is controllable to move the at least one soldering arm relative to the other soldering arm.

2. The soldering apparatus of claim 1, wherein the soldering tip comprises a substantially needle-shaped contact head having a small diameter.

3. The soldering apparatus of claim 1, wherein the connection portion is substantially semi-cylindrical, and comprising of opposite side surfaces, a front surface, and a circumferential surface adjoining the side surfaces and the front surface, wherein the latching groove is formed on the circumferential surface and extended along a circumferential direction.

4. The soldering apparatus of claim 3, wherein the positioning member defines a cutout, and the connection portion is received in the cutout with the surface of the contact head contacting the positioning member.

5. The soldering apparatus of claim 1, wherein the heating member comprises a heating portion defining a latching groove therein to engage the connection portion of the soldering tip.

6. The soldering apparatus of claim 1, wherein the soldering tip is made of tungsten steel.

7. The soldering apparatus of claim 1, wherein the soldering tip is made of ceramic.

8. The soldering apparatus of claim 1, wherein the base body comprises a first plate and a second plate cooperatively defining a groove to at least partially receive the actuator.

9. The soldering apparatus of claim 1, wherein the actuator comprises a power source and two connection portions coupled to the power source.

10. The soldering apparatus of claim 9, wherein the power source comprises a pneumatic component or an electric actuator.

11. A soldering apparatus comprising:
    a base body;
    an actuator connected to the base body; and
    at least two soldering arms arranged in parallel, and connected to the actuator, each of the at least two soldering arms comprising a heating member and a soldering tip thermally coupled to the heating member;
    a pair of clamping members connected to the base body and clamping the soldering tip therebetween; and
    a positioning member positioned between the pair of clamping members and coupled to the soldering tip;
    wherein the soldering tip comprises a connection portion and a contact head integrally formed with the connection portion, the connection portion defines a latching groove, the positioning member comprises a latching portion engaging the latching groove, and the actuator is controllable to move at least one soldering arm relative to the other soldering arm.

* * * * *